United States Patent
Rubio et al.

(10) Patent No.: US 6,547,302 B1
(45) Date of Patent: Apr. 15, 2003

(54) VEHICLE SEAT LOCKING DEVICE

(75) Inventors: Francisco Dominguez Rubio, Burgos (ES); Rafael Olmedo Diez, Burgos (ES)

(73) Assignee: Grupo Antolin Ingenieria, S.A., Burgos (ES)

( * ) Notice: Subject to any disclaimer, the term of this patent is extended or adjusted under 35 U.S.C. 154(b) by 0 days.

(21) Appl. No.: 09/830,087
(22) PCT Filed: Aug. 23, 1999
(86) PCT No.: PCT/ES99/00271
§ 371 (c)(1), (2), (4) Date: Aug. 8, 2001
(87) PCT Pub. No.: WO01/14166
PCT Pub. Date: Mar. 1, 2001
(51) Int. Cl.⁷ .................................................. B60N 2/02
(52) U.S. Cl. ................................ 296/65.09; 296/65.16; 297/378.12; 297/378.13
(58) Field of Search .......................... 296/65.09, 65.16; 297/378.1, 378.11, 378.12, 378.13

(56) References Cited

U.S. PATENT DOCUMENTS 3,410,600 A   11/1968   Thorpe

FOREIGN PATENT DOCUMENTS

| DE | 44 44 122 C1 | 4/1996 |
| FR | 2 774 122 | 1/1999 |

*Primary Examiner*—Joseph D. Pape
(74) *Attorney, Agent, or Firm*—Browdy and Neimark, P.L.L.C.

(57) ABSTRACT

A vehicle rear seat lock that has a latch (3), a trigger (1) and a bolt housed in a recess (2) in the trigger, according to which the safety of the unit against unwanted opening is increased.

5 Claims, 2 Drawing Sheets

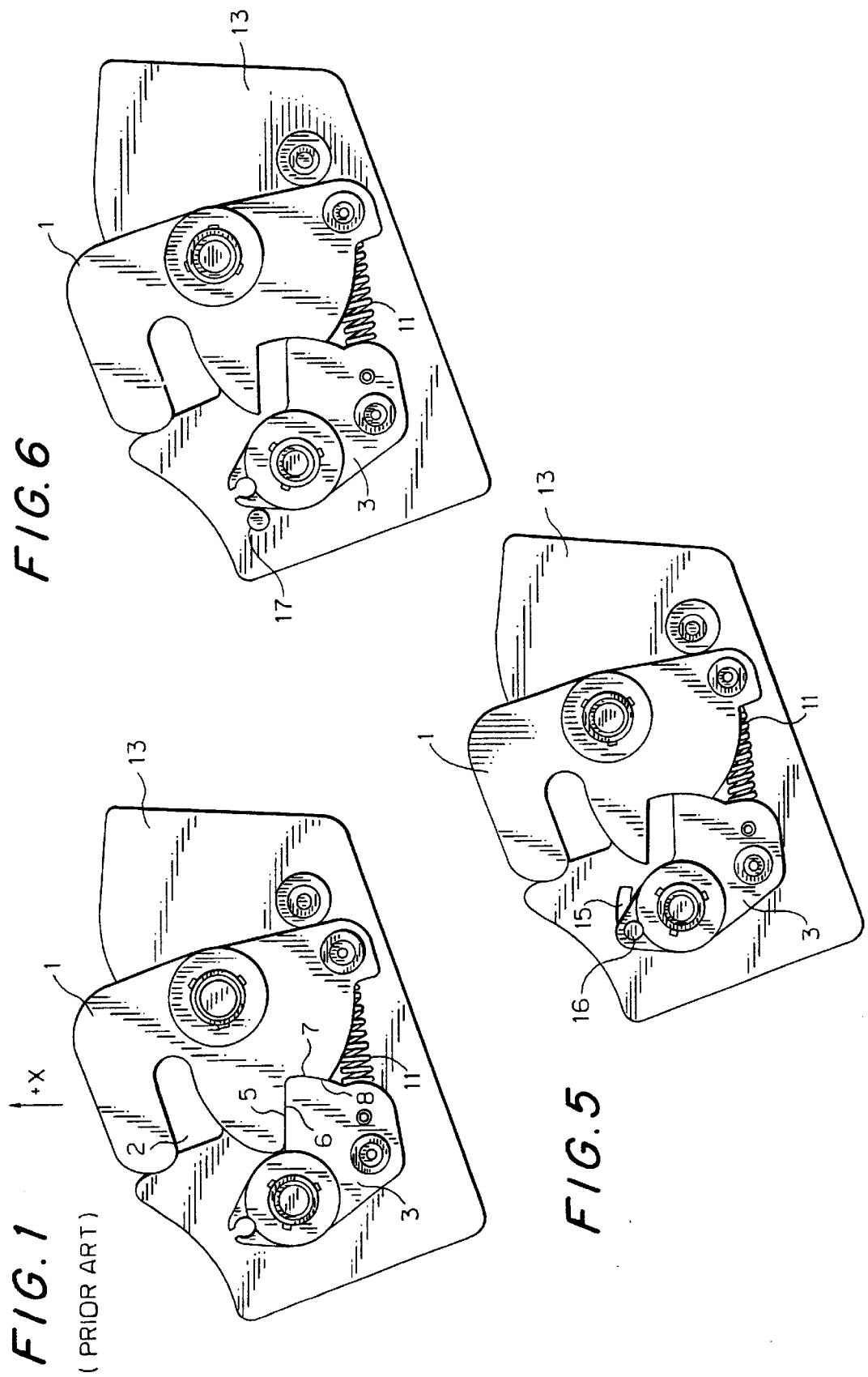

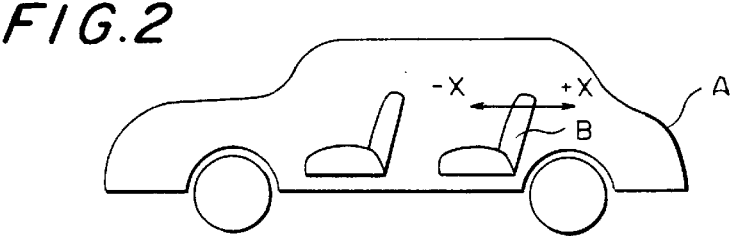
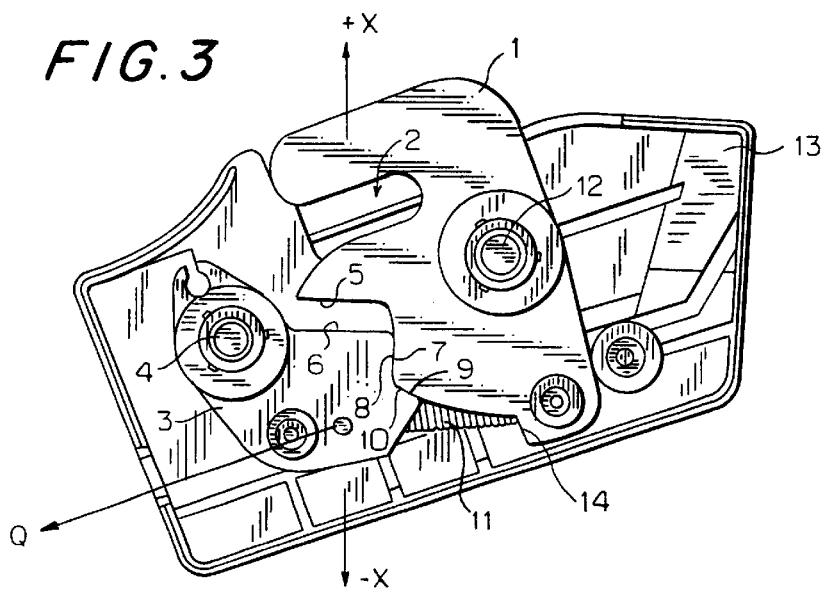
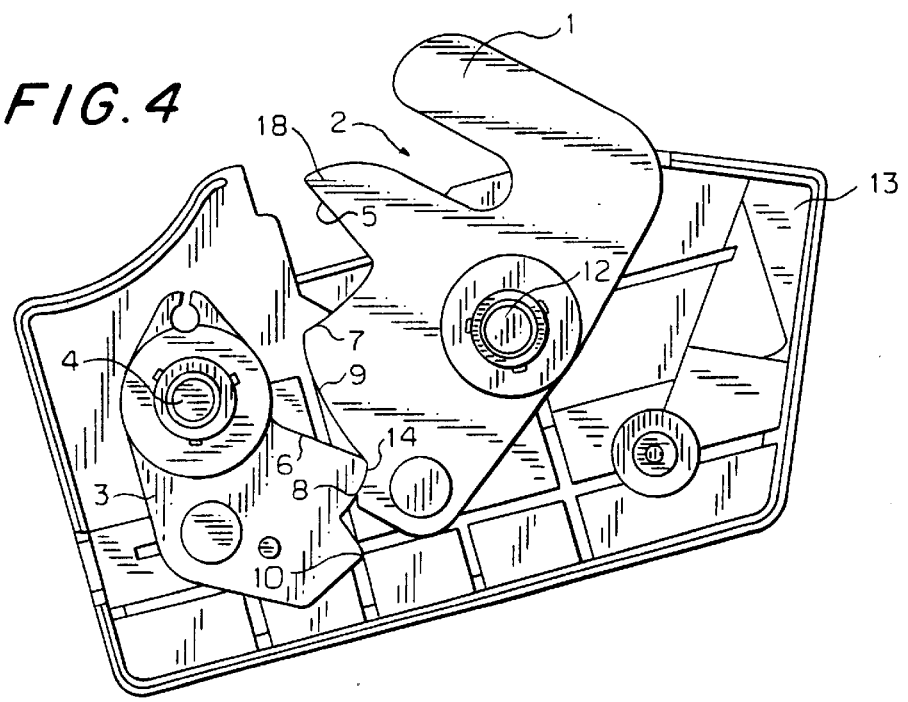

VEHICLE SEAT LOCKING DEVICE

The present application is the national stage under 35 U.S.C. §371 of international application PCT/ES99/00271, filed Aug. 23, 1999 which designated the United States, and which application was not published in the English language.

BACKGROUND OF THE INVENTION

1. Technical Field of the Invention

This invention relates to a rear seat lock for vehicles, with an anti-unlocking system incorporated, applicable to fold-down rear seats, of the type that have a set of locks with a latch or pawl and a trigger that turn, connected to a common spring and a bolt that is taken in by a recess in the trigger.

2. Prior Art

The lock is mounted on a base body and is situated either or on the bodywork of the vehicle, in combination with the corresponding bolt, which, in turn, is secured in reciprocation, either on the bodywork of the vehicle or on the fold-down seat.

The fundamental purpose of this type of lock is to enable to use of the seat by passengers, with the lock fastened, or fold down the seat to increase the boot space or carrying capacity, with the lock disengaged.

In the fastened or closed position, the lock must withstand the legal requirements and the manufacturers' own specifications concerning safety in case of an accident.

One of the dynamic tests that the lock must withstand is a front impact test, in which it must support loads moving towards the forward part of the vehicle caused by the inertia of the masses of the seats themselves, passengers and luggage in the boot.

The important loads or weights are normally in the direction explained and all the locks on the market are designed in order to withstand them.

However, it so happens that in certain vehicle bodywork structures, loads appear in the opposite direction during a collision, moving towards the rear of the vehicle, which causes a reaction against the lock-bolt system, resulting in the involuntary opening of the system and therefore not fulfilling the safety requirements.

As shall be seen later in relation with FIG. 1 of the drawings, the trigger and the latch of the lock are normally in frontal surface contact in assemblies of this type, in which the said contact surface acts as a support and stop of the movement of the latch. Due to the reaction against the resulting loads moving backwards, the trigger immediately forces or pushes the bolt, and as they are in surface contact, turning or pivoting of the trigger takes place at very high speed or acceleration, so that once it makes contact with the latch, it causes it to move in the opening direction, while the latch in turn allows free turning of the trigger and the consequent unlocking of the bolt, which initially had been kept under control.

OBJECT AND SUMMARY OF THE INVENTION

One object of the invention therefore is to provide a solution to the performance or behaviour of involuntary opening of the system in case of loads in a longitudinal direction and moving towards the rear part of the vehicle, while complying fully and absolutely with all the safety requirements.

For the putting into practice of this basic objective, the invention claims, in a lock of this type, provided with a latch and a trigger, with both being connected by a spring that tends to secure the closing position of the unit, the fact that both, latch and trigger, are offset in their frontal surface contact, with a security distance; the maintaining of an auxiliary surface contact between the two, in which the two surfaces in contact are arranged in such a way that the contact pressure passes through the turning or pivoting center of the latch in order to prevent accidental opening; the fact that the turning or pivoting of the latch is controlled in order to prevent transmission of movement from the trigger to the latch.

Alternatively, this last point claimed can be carried out by means of different practical solutions.

BRIEF DESCRIPTION OF THE DRAWINGS

The attached sheets of drawings will assist in the understanding of the idea and concepts of the invention, in which, without any restrictive nature, the following are represented:

FIG. 1 represents the traditional assembly and the arrangement between the latch and the trigger in the lock.

FIG. 2 shows the two loads that appear due to a frontal (head-on)collision.

FIG. 3 represents the lock in accordance with the invention, in its closed position, incorporating a preferred alternative to control the turning or pivoting of the latch.

FIG. 4 represents the lock shown in FIG. 3, in its open position.

FIG. 5 is a detail of another configuration to control the movement of the latch.

FIG. 6 is another variant to control the turning of the latch.

DETAILED DESCRIPTION OF THE PREFERRED EMBODIMENT(S) OF THE INVENTION

In accordance with FIG. 1, we can observe the lock which is traditionally used, mounted on a base (13), which consists of a latch (3), a trigger (1) and an intermediate spring (11). Both parts turn on their respective axes or shafts, and the trigger has a recess or gap (2) in which a bolt or pin, not illustrated, is received. This lock can be mounted on the seat or on the bodywork of the vehicle, to correspond with and match the bolt arranged on the bodywork or on the seat, respectively.

We can appreciate in this figure how the trigger and the latch have frontal contact between the surfaces (5, 6). With this contact, when loads are caused in a rearward direction (+x), they make the latch (3) hit the trigger (1), unfailingly causing the turning of the latter in a clockwise direction and allowing the bolt to leave its housing in the recess or space (2), thus causing the opening of the system and the folding down of the seat back.

FIG. 2 allows us to appreciate graphically the existence of the loads (−x) that can be withstood by the conventional system and the loads (+x) for which the system is not prepared and which create the risks mentioned previously.

According to FIG. 3, the body of the lock (13) is shown, with the trigger (1) and latch (3), arranged in such a way that the frontal surfaces of both (5, 6) remain at a certain distance from each other, preventing contact, and providing another surface contact (7, 8) between the trigger and latch whose purpose is to withstand the loads in the direction (+x), which are typical loads during the dynamic test or in case of accident, preventing the turning of the trigger in a clockwise direction in relation to its pivoting point (12).

Both side surfaces (7, 8) are of a circular shape and are arranged in such a way that the prolongation of the contact pressure passes through the pivoting center (4) of the latch in order to avoid accidental opening.

In these conditions, the turning of the trigger in a clockwise direction in relation to its center (12) is prevented, keeping the bolt always housed inside the recess (2) in it.

In order to position the latch (3) in relation to the trigger (1), another two surface areas (9, 10) are set up in contact, arranged in such a way that their contact pressure passes through the center of the trigger, thus preventing the transmission of movement from the trigger to the latch.

The opening cycle for the lock begins with the application of a force (Q) on the latch, through the control of the lock, not represented, causing a turning torque in a clockwise direction in relation to the pivoting center (4), with which a mutual sliding takes place between the surfaces (7, 8), until the system becomes completely unlocked, as shown in FIG. 4. In this unlocking, an additional surface area (14) of the trigger (1) makes contact with the surface (8) of the latch (3).

In this way, the turning movement of the latch (3) is limited in the anti-clockwise direction, with the particularity that the circular surface (14) has an axis or shaft which coincides with the spin axis of the trigger.

The control for opening the lock that causes the force (Q) can be of any type: push-button, handle, lever, etc.

As shown in FIG. 4, the latch (3) has had a controlled movement in the clockwise direction and the trigger (1) has also moved in the same direction and has turned to allow the bolt to leave the recess (2).

The closing cycle for the lock begins when the bolt puts pressures on the surface (18) of the trigger (1), causing a torque in an anti-clockwise direction on the pivoting point (12), turning the trigger and sliding the latch (3) along the surface (9) until it reaches the closed position. At this instant, the latch (3) turns in anti-clockwise direction on its pivoting centre (4) due to the torque created by the spring (11), until the surfaces (9, 10) are once again in contact—FIG. 3.

The limiting of the turning of the latch (3) in the anti-clockwise direction can be carried out by other means different from those mentioned. Therefore, in accordance with FIG. 5, a slot (15) is made in the body (13) of the lock, and the latch itself is provided with an attached pivot (16) that comes up against the said slot.

Another variant solution will consist, in accordance with FIG. 6, of placing an additional stop (17) fixed on the support plate (13), for instance a rivet, with which the turning of the latch is limited due to its contact with this part.

In these two last-mentioned variant solutions, it is obvious that the surfaces (10) of the latch and the surfaces (9, 14) of the trigger disappear.

With all this, as mentioned previously, the application of the invention prevents the unwanted opening, which is a safety condition, against loads that move in a different direction from the normal ones in use, such as can be caused in the case of an accident, brusque deceleration, etc.

What is claimed is:

1. A vehicle rear seat lock having a trigger (1) and latch (3), the trigger and latch interconnected by a spring (11) and rotatably engaged on a support plate (13), the trigger having a slot (2) adapted to receive a securing bolt of a vehicle rear seat, wherein when in a locked position the latch prevents turning of the trigger in an unlocking direction, said lock comprising:

a first set of contacting surfaces (7, 8) respectively located on the latch and trigger so that an impact force in a direction passes through a pivoting center (4) of the latch, a second set of contacting surfaces (9, 10) respectively extending down from the first set of contacting surfaces (7, 8) so that the impact force passes through a pivoting center (12) of the trigger, and separated surfaces (5, 6) respectively extending upward on the latch and trigger from the first set of contacting surfaces, the separated surfaces (5, 6) being spaced apart from each other, wherein transmission of the impact force in the direction +x from the latch to the trigger and a counterclockwise turning movement of the latch are both limited.

2. The vehicle rear seat lock according to claim 1, wherein the separated surfaces are substantially perpendicular to the first set of contacting surfaces.

3. The vehicle rear seat lock according to claim 1, wherein limitation of clockwise movement of the latch (3) is achieved by engagement of the contacting surface (8) of the first set of contacting surfaces on the latch (3) against an additional contacting surface (14) extending from the contacting surface (9) of the second set of contacting surfaces on the trigger.

4. A vehicle rear seat lock having a trigger (1) and latch (3), the trigger and latch interconnected by a spring (11) and rotatably engaged on a support plate (13), the trigger having a slot (2) adapted to receive a securing bolt of a vehicle rear seat, wherein when in a locked position the latch prevents turning of the trigger in an unlocking direction, said lock comprising:

a set of contacting surfaces (7, 8) respectively located on the latch and trigger so that an impact force in a direction +x passes through a pivoting center (4) of the latch, separated surfaces (5, 6) respectively extending upward on the latch and trigger from the set of contacting surfaces, the separated surfaces being spaced apart from each other, a slot (5) in the support plate (13) and a pivot (16) on the latch engaged in the slot (15) to limit counterclockwise movement of the latch (3), and wherein transmission of the impact force in a direction +x from the latch to the trigger and a counterclockwise turning movement of the latch are both limited.

5. A vehicle rear seat lock having a trigger (1) and latch (3), the trigger and latch interconnected by a spring (11) and rotatably engaged on a support plate (13), the trigger having a slot (2) adapted to receive a securing bolt of a vehicle rear seat, wherein when in a locked position the latch prevents turning of the trigger in an unlocking direction, said lock comprising:

a first set of contacting surfaces (7, 8) respectively located on the latch and trigger so that an impact force in a direction +x passes through a pivoting center (4) of the latch, separated surfaces (5, 6) respectively extending upward on the latch and trigger from the set of contacting surfaces, the separated surfaces (5, 6) being spaced apart from each other, a stop on the support plate (15) that makes contact with the latch to limit of counterclockwise movement of the latch (3), and wherein transmission of the impact force in a direction +x from the latch to the trigger and a counterclockwise turning movement of the latch are both limited.

* * * * *